Nov. 5, 1940.  C. HOOPPAW  2,220,787
SHOCK ABSORBING WINDSHIELD
Filed April 12, 1940
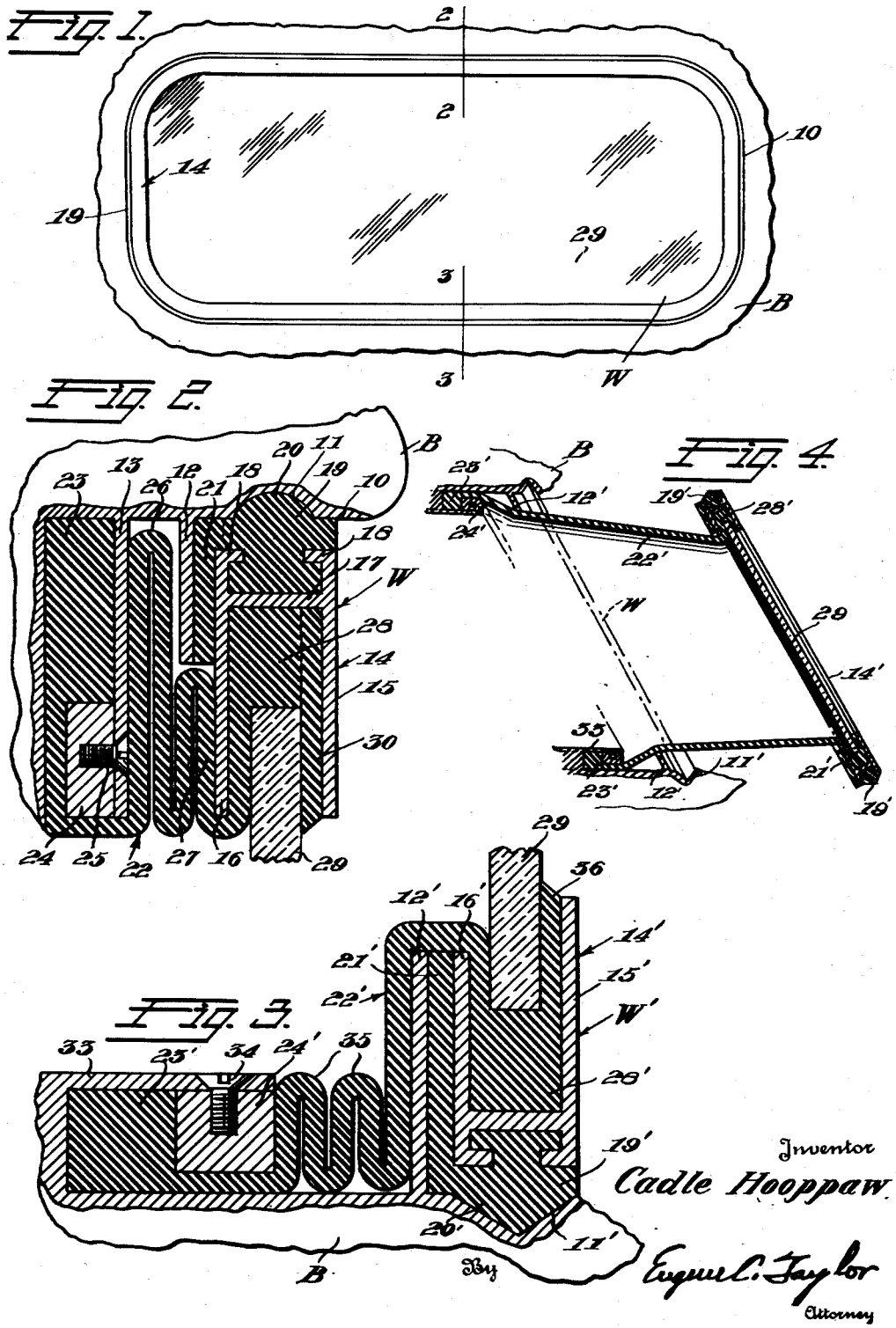
Inventor
Cadle Hooppaw
By Eugene C. Taylor
Attorney Patented Nov. 5, 1940

2,220,787

UNITED STATES PATENT OFFICE 2,220,787

SHOCK ABSORBING WINDSHIELD

Cadle Hooppaw, Washington, D. C.

Application April 12, 1940, Serial No. 329,376

9 Claims. (Cl. 296—84)

This invention relates to shock absorbing windshield constructions.

The invention is more particularly concerned with safety windshields for motor vehicles or the like, to prevent injury to occupants of vehicles such as is commonly occasioned by bodily contact with the windshield thereof.

Windshields in motor vehicles as now generally constructed are often the cause of more or less serious injury to passengers through impact therewith due to collision, or sudden stopping in emergencies or through grabbing or locking brakes.

This source of danger has heretofore been recognized and various forms of windshield constructions have been devised to avoid injury by impact or shattered glass caused by such impact.

Some proposed constructions embodied either a tiltable windshield or a fully releasable windshield; the windshield in either case being pushed from its normal position through body contact therewith with sufficient ease to avoid injury either through the impact or the possible shattering of the windshield glass.

These constructions, however, did not offer a satisfactory safeguard against injury, particularly upon collision of motor vehicles travelling at relatively high speeds, for the reason that while the windshields offered little resistance to tilting or displacement they left the frame receiving openings unobstructed for projection of the occupant's body thereinto or therethrough with the possibility of more serious injury than would be caused by impact with the stationary windshield.

A primary object of this invention is the provision of a windshield construction whereby the impact of a body therewith is cushioned and is also retained against injurious projection through the windshield opening.

A further object of the invention is the provision of a windshield construction embodying a glass supporting frame having a flexible and yieldable connection with a vehicle body for displacement from its normal position, and yieldable means for holding the frame in normal position.

A still further object of the invention is the provision of a windshield construction which is yieldably displaceable from normal position upon body impact therewith while at the same time completely housing the windshield opening in the vehicle body against atmospheric elements as well as preventing any substantial projection of a body therethrough.

With the foregoing and other objects in view, the invention consists in the novel construction, combination and arrangement of parts as hereinafter more particularly described and illustrated in the accompanying drawing, wherein—

Fig. 1 is a front or external elevation of a windshield constructed in accordance with this invention, the body of the vehicle being broken away adjacent the margin of the windshield;

Fig. 2 is an enlarged transverse section in a plane substantially as represented by line 2—2 in Fig. 1;

Fig. 3 is a similar view of a modified construction in a position substantially as represented by line 3—3 in Fig. 1; and Fig. 4 is a complete transverse section corresponding in position to lines 2—2 and 3—3 in Fig. 1 and showing the structure according to the embodiment of Fig. 3.

Referring to the drawing in detail and first to Figs. 1 and 2, B designates the portion of a motor vehicle body adjacent the windshield construction which is comprehensively designated as W.

The vehicle body B is provided with the usual more or less rectangular opening 10 for receiving the windshield frame, the opening 10 is provided with a groove 11 which is arcuate in cross section and the body B is provided inwardly of the groove 11 with a relatively shallow flange 12 and in spaced relation thereto with a deeper flange 13.

The windshield frame comprises a rigid member 14 including an outer sidewall 15 and an inner sidewall 16, the sidewalls 15 and 16 being spaced apart and interconnected adjacent their outer edges by the partition 17, with said sidewalls projecting inwardly at their outer edges in the form of flanges 18 in spaced relation to the partition 17.

A band of rubber 19 surrounds the rigid member 14 and is maintained in fixed connection therewith by engagement of the flanges 18 in correspondingly shaped recesses in the band and with the base of the band confined between said flanges, the portion 17, and the opposed sidewalls 15 and 16.

The band 19 is provided with a transversely arcuate rib 20 conforming with and normally seated within the groove 11 and the band is further provided with an extension 21 normally engaged with the outer side of the flange 12 and which yieldably supports the frame against inward movement.

The frame 14 has a flexible and yieldable connection with the body B through a shock absorbing unit 22 which is preferably formed of rubber and includes a relatively thick edge portion 23 disposed between the body B and the flange 13 and locked in position by means of a batten 24 which is secured to the flange 13 adjacent its free edge by means of screws or like fastenings 25.

The unit 22 further includes an intermediate extensible portion which normally lies in folds 26 and 27 between the flange 13 and the flange 12 and frame 14 as is clearly indicated in Fig. 2. The unit 22 adjacent its opposite edge extends around the free edge of the inner frame side wall 16, and terminates in a thickened portion 28 disposed between the side walls 15 and 16 and contacting the partition 17.

The windshield glass panel 29 at its margin rests in a channel defined by the intermediate portion of the unit 22 and the thickened portion 28 with the outer surface of the panel flush with the outer face at the portion 28 and both in spaced relation to the frame sidewall 15.

A sheet of rubber, cork, or other material 30 is disposed between the panel 29 and the frame sidewall 15 to prevent direct contact of the glass with the metal frame, the glass thereby being supported in a weather-tight cushioning means in the frame.

The construction, according to Fig. 3, is quite similar to that of Fig. 2 but differs therefrom in the following respects.

In this embodiment, the inner sidewall 16' of the frame 14' is narrower than the outer sidewall 15' and is equal in depth to a body flange 12', the flange 13 of the first embodiment being omitted.

The body B is provided with a horizontally extending flange 33 forming in combination with the body a pocket for reception of the enlarged edge 23' of the shock absorbing unit 22' and which is retained in permanent position by means of a batten 24' secured to the flange 33 by means of screws 34 or like fastenings.

The shock absorbing unit 22' in its normal position embodies equal depth folds 35 lying between the flange 12' and the batten 24' and the intermediate portion of the unit extends along the inner face of the flange 12' across the free edges of the flange and the inner frame sidewall 16' and into the space between the frame sidewalls 15' and 16', terminating in an enlarged edge portion 28' which portion includes an extension 36, which replaces the strip 30 in the first embodiment.

Also in this embodiment the band 19' embodies an extension 21' which is positioned between the flange 12' and inner frame sidewall 16' as in the first form but is wider or deeper and extends to the free edges of the sidewall 16' and flange 12' as is clearly indicated. Furthermore, the groove 11' in the frame B is angular instead of arcuate as in the first form and detachably receives the correspondingly shaped ridge 20' on the band 19'.

Thus the two embodiments of the invention disclosed are quite similar in construction and function in substantially the same manner.

Fig. 4 illustrates in a more or less diagrammatical manner the windshield in its displaced position as upon having been subjected to impact from within the vehicle body.

The windshield frame 14 or 14' is normally maintained in position through yieldable pressure engagement of the rib 20 or 20' in the corresponding groove 11 or 11', such pressure contact being sufficient to hold the frame in normal position unless subjected to substantial impact from within the vehicle. Furthermore, this yieldable connection is weather-tight and avoids any possible rattling of the frame as may otherwise be occasioned in metal to metal contact with the wall of the body opening 10.

When the windshield frame is in its normal position the shock absorbing unit 22 or 22' is concealed between the frame and body B of the vehicle and therefore the windshield presents the usual attractive external appearance as can be observed from Fig. 1.

When, however, the windshield frame is subjected to substantial pressure from within the body B as by impact of a passenger with the glass panel 29 as may be occasioned by collisions, emergency stops, or faulty brakes, the rib 20 or 20' will yield to permit displacement of the frame from its normal position as indicated in Figs. 2 and 3 and in dot-and-dash lines in Fig. 4 to the position indicated in full lines in Fig. 4.

This displacement of the frame reduces the shock of impact and the inherent resiliency of the shock absorbing unit 22 or 22' acts to bring the displaced windshield frame to a stop in its fully displaced position.

It is to be particularly noted that the windshield frame is permanently secured to the vehicle body B through the unit 22 or 22' and that such unit in the displaced position of the frame forms a weather-tight housing around the perimeter of the opening 10 and between same and the frame.

Furthermore, this construction provides for displacement of the windshield substantially parallel to its normal position whereby a passenger's vision is in no way obstructed and as the displaced windshield is directly in front of the body opening 10 a passenger is not liable to injury by having his body thrown through the windshield opening as would be the case with prior proposed constructions.

While Fig. 4 illustrates the operation of the embodiment of Fig. 3, the embodiment of Fig. 2 would function in substantially the same manner, in each case the normally folded shock absorbing unit straightening out and retaining the windshield opening closed with the displaced windshield substantially parallel to and horizontally in advance of its normal position.

In each embodiment the connection 23, 24 or 23', 24' of the shock absorbing unit is weather-tight with the body B in view of which passengers will not be subjected to any detrimental action of the elements when the windshield is in its displaced position.

While I have disclosed only certain specific embodiments of my invention, such are to be considered as illustrative, and not restrictive, the scope of the invention being defined in the subjoined claims.

What I claim and desire to secure by Letters Patent is—

1. In combination with a vehicle body having a windshield opening therein, a windshield frame having a yieldable member encircling same, and a groove in the wall of said opening removably receiving the yieldable member, said yieldable member and groove cooperating to hold the windshield in normal position, and elastic shock absorbing means permanently connecting the windshield to the body so as to absorb the shock to the windshield upon its release by the yieldable member and groove by impact from within the vehicle.

2. In combination with a vehicle body having a windshield opening therein, a windshield frame normally disposed within the opening, a shock absorbing member of generally tubular form having one end thereof secured to the body and the other end thereof secured to the frame, and a pressure releasable connection between the margin of the opening and the frame.

3. In combination with a vehicle body having a windshield opening therein, a windshield frame normally disposed within the opening, a yieldable connection between the frame and wall of the opening for displacement of the frame when subjected to lateral pressure, and an elastic shock absorbing means permanently connected with the body and the margin of the frame for permitting displacement of the frame to a limited extent from its normal position and cushioning the movement of the frame in such displacement.

4. In combination with a vehicle body having a windshield opening therein, a windshield frame normally disposed within the opening, a flexible and yieldable tube-like member normally collapsed and having one end thereof secured to the margin of the frame and the other end thereof secured to the body rearwardly of the frame, the member being extensible from its collapsed position to permit displacement of the frame in advance of the opening, and a pressure releasable connection between the frame and the wall of the opening to permit such displacement of the frame upon application of pressure thereto.

5. The structure according to claim 4 wherein said member forms a weather-tight connection between the body and frame and encloses the space between the margin of the frame and opening when the frame is in displaced position.

6. The structure according to claim 4, wherein said pressure releasable connection comprises a yieldable rib on the outer edge of the frame removably seated in a groove in the wall of said opening.

7. In combination, a vehicle body having a substantially rectangular windshield opening therein, a windshield fitting said opening, and elastic shock absorbing means permanently connecting the sides of the frame to the respective sides of the opening, said means stretching under impact to absorb shock.

8. In combination with a vehicle body, a windshield frame, an elastic shock absorbing means permanently attached to the body and frame to absorb shock from impact from within the vehicle, and a pressure releasable connection between the frame and the body, said connection retaining the windshield in normal position and releasable upon impact subsequently absorbed by the electric shock absorbing means as the windshield is moved outwardly of the vehicle.

9. In combination with a vehicle body, a windshield frame, a pressure releasable connecting means between the body and the frame for holding the frame in normal position in the body and permitting displacement of the frame on impact from within the vehicle, and elastic shock absorbing means permanently attached to the body and frame to absorb the impact after the windshield has been displaced from normal position.

CADLE HOOPPAW.

CERTIFICATE OF CORRECTION.

Patent No. 2,220,787. November 5, 1940.

CADLE HOOPPAW.

It is hereby certified that error appears in the printed specification of the above numbered patent requiring correction as follows: Page 3, second column, line 23-24, claim 8, for the word "electric" read --elastic--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.